G. W. ANTHONY.
STREET SCRAPER.
APPLICATION FILED JUNE 10, 1912.
1,079,587.
Patented Nov. 25, 1913.
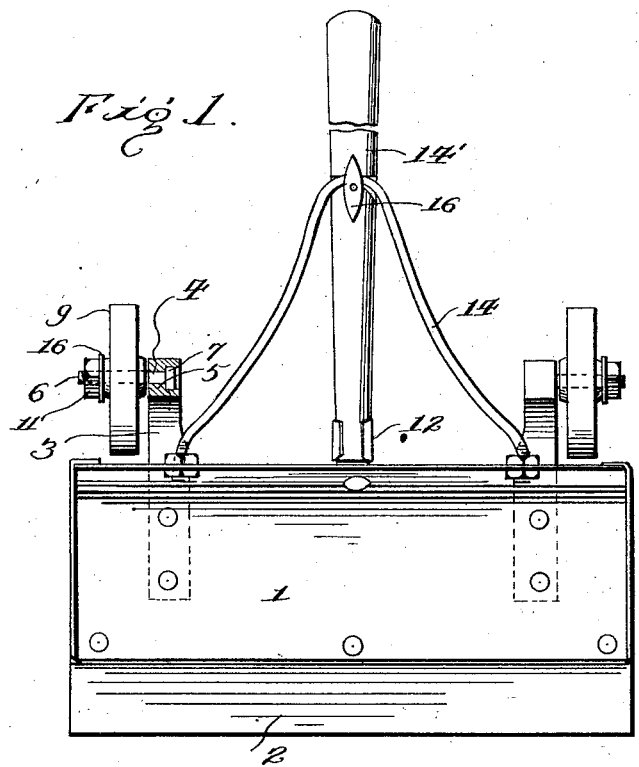
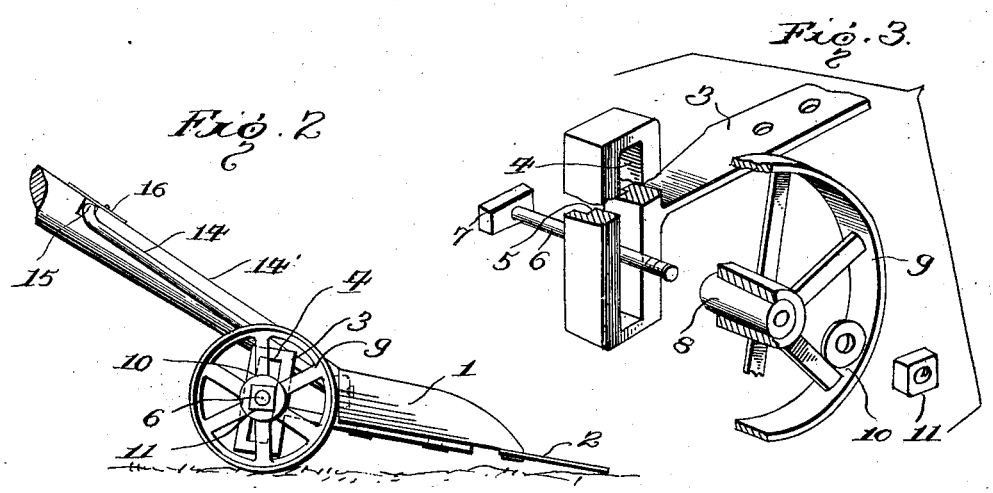
Witnesses
Inventor
G. W. Anthony.
By ____, Attorneys.

UNITED STATES PATENT OFFICE.

GEORGE W. ANTHONY, OF MONTPELIER, INDIANA.

STREET-SCRAPER.

1,079,587. Specification of Letters Patent. Patented Nov. 25, 1913.

Application filed June 10, 1912. Serial No. 702,874.

*To all whom it may concern:*

Be it known that I, GEORGE W. ANTHONY, citizen of the United States, residing at Montpelier, in the county of Blackford and State of Indiana, have invented certain new and useful Improvements in Street-Scrapers, of which the following is a specification.

This invention has relation to street scrapers and has for its object to provide a scraper of simple construction mounted upon wheels whereby it may be easily and readily trundled from point to point.

With this object in view the scraper consists of a pan upon which is detachably mounted a share. Brackets are connected to the pan, and upon the brackets adjustable supporting wheels are mounted. A detachable handle is connected with the pan.

In the drawings: Figure 1 is a top plan view of the scraper; Fig. 2 is a side elevation of the same; Fig. 3 shows perspective view of parts of the same separated and broken away.

Corresponding and like parts are referred to in the following description and indicated in all the views of the accompanying drawings by the same reference characters.

The scraper consists of a pan 1 which is of the usual configuration. To this pan is attached a detachable share 2. Brackets 3 are fixed to the pan and may be disposed rearwardly as shown, or beyond the sides of the pan if preferred. The brackets 3 are provided with vertically disposed openings 4 which in turn are provided at their vertical sides with ribs 5. Spindles 6 are provided at their inner ends with heads 7 which bear against the ribs 5. The said heads are seated within the openings 4. Collars 8 are mounted upon the spindles 6, and wheels 9 are journaled upon the collars. Washers 10 bear against the outer ends of the collars 8 and securing nuts 11 are screw-threaded upon the outer ends of the spindles, whereby the washers are held in close contact with the outer ends of the collars. The inner ends of the collars bear directly against the outer sides of the brackets 3. A socket 12 is fixed to the rear side of the pan 1 approximately midway between the ends thereof. A brace yoke 14 is connected at its ends with the back of the pan 1 and is disposed behind the pan. A handle 14' is inserted at its forward end in the socket 12 and is provided with a recess 15 which receives the intermediate portion of the yoke 13. A button 16 is pivoted upon the handle adjacent the recess 15 and is adapted to be swung over the intermediate portion of the yoke 13 to hold the handle in engagement with the yoke. By swinging the button so that its end is moved from over the intermediate portion of the yoke, the said handle may be readily disconnected from the pan for storage or other purposes.

By reason of the fact that the spindles 6 are vertically adjustable in the brackets 3 the pan may be pitched at a desired angle with relation to a horizontal in order that the handle may be readily and conveniently used by a person of comparatively tall or diminutive stature. Furthermore, when the pan is loaded with material it may be easily and readily trundled, thereby saving wear upon the share; also the scraper may be moved along a street without having the share in engagement with the surface thereof and thus the device may be readily transported by an operator before and after working hours.

Having described the invention, what I claim as new is:

The combination of a bracket having a vertically disposed extension at its free end, said vertical extension being slotted and provided on the vertical walls of the slot inwardly from the inner face of the extension with vertical ribs, a spindle inserted through said slot and provided at its inner end with an angular head fitting between the walls of the slot and against the inner edges of the ribs, a sleeve mounted on the outer end of the spindle and bearing against the outer face of the extension, a wheel rotatably mounted on said sleeve, a washer on the spindle against the end of the sleeve, and a nut mounted on the spindle and bearing against the washer to retain the wheel on the sleeve and secure the spindle in the extension of the bracket.

In testimony whereof I affix my signature in presence of two witnesses.

GEORGE W. ANTHONY. [L. S.]

Witnesses:
CHARLES H. MORSE,
R. ROY HENDERSON.

---

Copies of this patent may be obtained for five cents each, by addressing the "Commissioner of Patents, Washington, D. C."